United States Patent [19]
Chiselko et al.

[11] 4,155,655
[45] May 22, 1979

[54] APPARATUS FOR ADDITIVE FEEDING

[75] Inventors: John J. Chiselko, Martinsville; William H. Hulbert, Somerville, both of N.J.

[73] Assignee: Egan Machinery Company, Somerville, N.J.

[21] Appl. No.: 752,745

[22] Filed: Dec. 21, 1976

Related U.S. Application Data

[62] Division of Ser. No. 548,283, Feb. 10, 1975, Pat. No. 4,006,209.

[51] Int. Cl.² .............................................. B29B 1/06
[52] U.S. Cl. ....................................... 366/83; 366/88; 366/89; 366/146; 366/156; 366/323; 425/208
[58] Field of Search .................. 259/191, 192, 193, 9, 259/10, 25, 26, 45, 46, 97; 425/207, 208, 209; 366/83, 88, 89, 156

[56] References Cited

U.S. PATENT DOCUMENTS

| 3,035,306 | 5/1962 | Rossiter | 425/208 |
| 3,746,315 | 7/1973 | Rizzi | 259/192 |
| 3,860,220 | 1/1975 | Matsubayashi | 259/192 |
| 3,868,093 | 2/1975 | Sokolow | 259/191 |
| 3,985,348 | 10/1976 | Skidmore | 259/191 |

Primary Examiner—Robert W. Jenkins
Attorney, Agent, or Firm—Edward R. Weingram

[57] ABSTRACT

A method and apparatus for feeding an additive, such as glass fibers, fillers, etc., to a plastic resin in an extruder is disclosed. The additive is fed by means of a screw type feeder into the barrel of a plastics extruder or reciprocating screw plastifier at a location where the resin is molten and the resin pressure is low.

12 Claims, 2 Drawing Figures

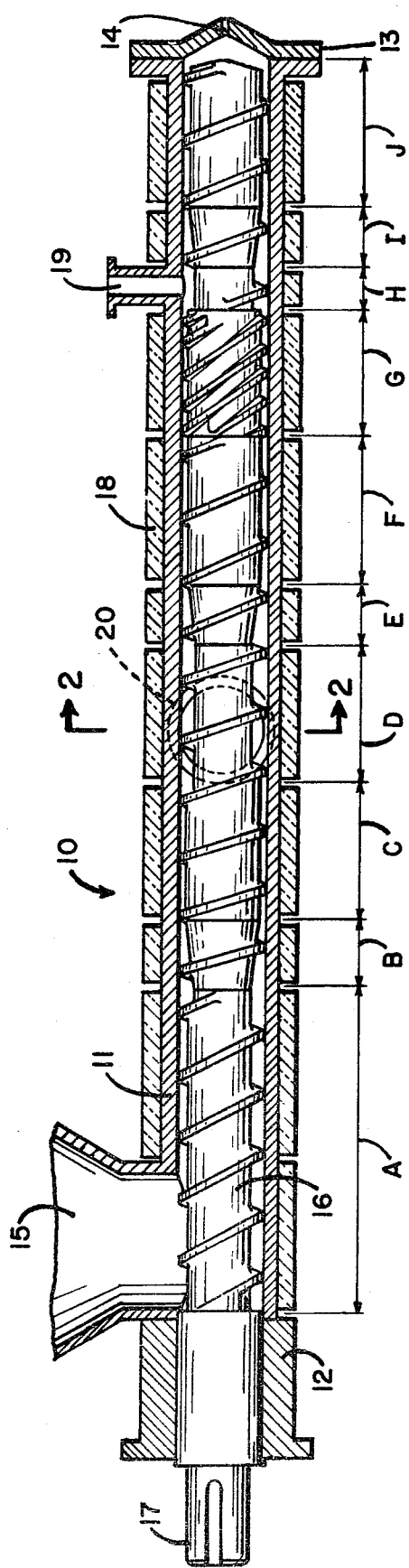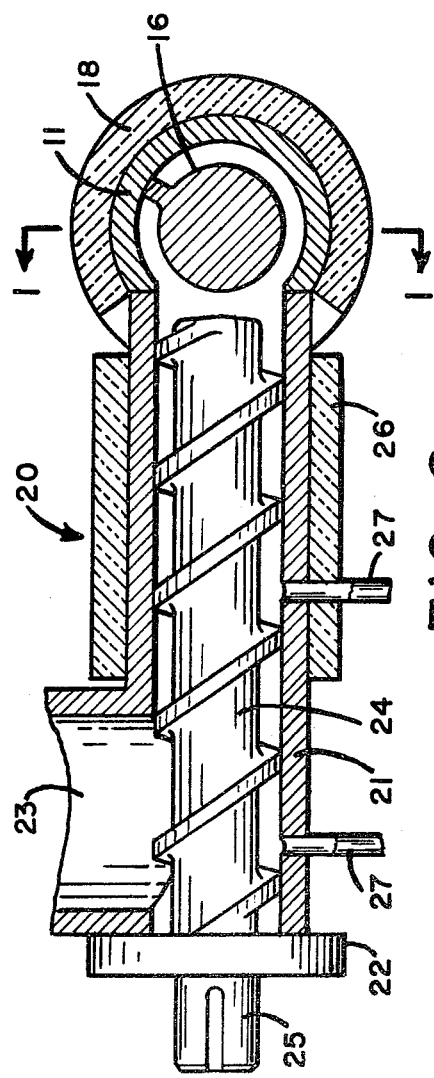

APPARATUS FOR ADDITIVE FEEDING

This is a division, of application Ser. No. 548,283 filed Feb. 10, 1975 now U.S. Pat. No. 4,006,209.

BACKGROUND OF THE INVENTION

This invention relates to a method and apparatus for the preparation of reinforced or filled synthetic resins by extrusion.

It is known in industry that the physical, chemical and other properties of extruded and injection molded synthetic resins may be enhanced by the incorporation in these resins of one or more of certain other materials, hereinafter called additives. One of these additive materials comprises filamentary reinforcing, such as glass fibers, another comprises a resin different from the primary resin, and others comprise materials for other purposes, such as fillers of low cost materials to provide a lower cost of product.

In the contents of these specifications and claims, the word "extruder" is understood to include both an extruder, having a rotating screw, used for the heat plastifying and extrusion of plastics materials and a reciprocating screw plasticizer, having a rotating and reciprocating screw, as used on injection molding machines and as is disclosed in U.S. Pat. No. 2,734,226. The word "resin" is understood to include any thermoplastic or thermosetting plastics materials that are capable of being extruded in the conventional single or multiple screw extruder or reciprocating screw plasticizer wherein the resin is introduced into the extruder or plasticizer through a feed opening, is melted and mixed by a rotating screw or screws and is discharged under pressure as a molten material through a discharge orifice. The word "additive" is understood to mean any material which is added to and mixed with the resin in the carrying out of the process of the present invention.

One method for incorporation of additives into the resin is to premix the resin and additive in a mixer or blender and then feed the mixture to a feed opening of a conventional extruder. Disadvantages of this method include: first, the requirement of a separate batch mixing operation with the associated equipment; second, the inability to change or adjust the proportion of additive to resin during the running of the extruder; third, the difficulty of feeding the extruder with the mixer, especially when the mixture consists of a high proportion of additive to resin; and, fourth, the fact that the additive must undergo the same conditions of temperature, pressure and mixing required to melt and mix the resin which in the case of many additives results in thermal or physical degradation of the additive.

An improvement to the above method is disclosed in U.S. Pat. No. 3,520,027 wherein both the resin and additive are separately fed to a common feed section of an extruder, or fed to a continuous mixer which then discharges to a common feed section of an extruder. This improvement alleviates somewhat the first and second disadvantages of the aforementioned method but the third and fourth disadvantages remain.

U.S. Pat. No. 3,304,282 discloses that the resin may be supplied in powder or granulate form through the feed inlet of an extruder and melted in the kneading zone. After the last melting and kneading operation in the kneading zone, glass fibers of short length are added and mixed with the melt. However, no method or apparatus is disclosed for introducing the fibers into the resin, and it is specifically pointed out in the patent that it is difficult technically to meter in these fibers uniformly.

SUMMARY OF THE INVENTION

The present invention provides a method and apparatus to carry out such method which overcomes the problem of nonuniformity of additive feed and which also provides additional advantages to prior art methods, including the ability to feed a very high percentage of various additives in addition to glass fibers to the resin.

Briefly, the invention comprises melting and mixing the resin in the first stage of an extruder screw and introducing the additive material into the primary material in a low pressure zone in the second stage of the screw by means of an additive screw feeder.

DRAWINGS

FIG. 1 is a central longitudinal sectional view through a plastics extruder barrel incorporating the present invention.

FIG. 2 is a longitudinal sectional view through 2—2 of FIG. 1 and showing the screw feeder for additives.

DESCRIPTION OF PREFERRED EMBODIMENT

In FIG. 1, 10 represents a single screw plastics extruder comprising a barrel 11, a feed end closure 12, a discharge closure 13 having a discharge orifice 14 and a resin feed opening 15. Positioned within barrel 11 is an extrusion screw 16 having an axial extension 17 which is adapted to be coupled to a rotary drive means (not shown).

As is shown in the illustrated embodiment of the invention, extruder screw 16 is preferably a three stage screw having a first melting stage comprising a feed section A, a transition section B and a metering section C. The second or mixing stage comprises low pressure section D, second transition section E, second metering section F and preferably a mixing section G. It will be noted that the channel depth, that is, the distances from the root radius of the screw to the outside diameter of the screw, is greater in the low pressure section than in the metering section. By suitable design of the screw and selection of the channel depths as is well known in the art, the resin pressure in the low pressure section will be maintained at atmospheric or substantially atmospheric pressure. Mixing section G, if used, is preferably of the type disclosed in U.S. Pat. No. 3,411,179; but other known extruder screw mixing sections may be used. The third or venting and discharge stage comprises second low pressure section H, third transition section I and third metering section J.

Surrounding the barrel 11 are conventional heating means 18. At a location corresponding to the second low pressure section H is vent opening 19 in the barrel which, if desired, may be connected to vacuum means in a manner well known in the art. At a location corresponding to the first low pressure section D is provided additive feeder 20 shown in further detail in FIG. 2. Additive feeder 20 comprises a barrel 21 mounted to extruder barrel 11 so that the bore of the additive feeder barrel intersects the bore of the extruder barrel. At the feed end of additive feeder barrel 21 is provided feed end closure 22 and additive feed opening 23. Positioned within the additive feed barrel is feeder screw 24 having an axial extension 25 which is adapted to be coupled to a rotary drive means (not shown). It is preferred that the drive means for the extruder screw and the feeder screw shall each be capable of being adjusted in speed independently of each other. Surrounding the feeder barrel 21 between the feed opening and the extruder barrel are conventional heating means 26.

In operation in the embodiment shown, resin is supplied to extruder feed opening 15 in the form of granules, pellets, flakes, powder, or other form. The rotation of the extruder screw 16 conveys the resin through the first stage A, B, and C wherein the resin is melted by means of the heat supplied by heaters 18 and the frictional heat developed by the shearing and mixing of the resin between the rotating screw and the barrel. The resin pressure is raised above atmospheric pressure in transition section B and metering section C due to the decreased channel depths in these sections. The molten resin is thence conveyed into low pressure section D of the second stage wherein the resin pressure is decreased to atmospheric or substantially atmospheric pressure. At this location the additive, which has been supplied to the feed section 23 of the additive feeder and conveyed in the direction of the extruder barrel by the additive feeder screw 24, is introduced into the extruder and combines with the molten resin in a continuous operation. Since the resin is at low pressure at the location at which the resin and additive combine, the additive feeder is not required to exert any more than a minimum pressure on the additive to introduce it into the extruder.

The combined resin and additive is conveyed then through the second stage sections D, E and F of the extruder screw where they are partially mixed and raised to a higher pressure. Passing through the mixing section G of the second stage, the resin and additive are thoroughly mixed and conveyed to the second low pressure section H of the third stage where the pressure is again lowered and any volatiles in the mixture are removed through the vent opening 19. The mixture of resin and additives then is conveyed through the third metering section J where the pressure is raised and the mixture is discharged under pressure through the extruder discharge orifice 14, which may be in the form of a die for forming the extrudate into whatever shape is desired.

For some types of plastics materials, it is desirable to apply heat to the portion of the additive feeder barrel nearest the extruder barrel, as by means of heaters 26 of FIG. 2, in order to maintain the elevated temperature of the extruder barrel in the vicinity of its junction with the additive feeder barrel. This prevents any solidification of the molten resin due to cooling at the point at which the additive is introduced.

For certain additives it is required that a blanketing gas be provided to exclude contact with atmospheric oxygen. For this purpose the additive feeder barrel is provided with one or more ports 27 for the introduction of the blanketing gas to the additive in the feeder barrel. These ports also may be used to introduce a gas desired as a catalyst for the additive or the resin.

The invention may be used in the same manner in conjunction with reciprocating screw plasticizers with the additional requirement that the low pressure section of the screw corresponding to section D of FIG. 1 be of sufficient length so that the additive will always be fed into this low pressure section at all axial positions of the reciprocating screw.

In some instances it may be desirable to provide control means for the drive means for the extruder and feeder which allow the operator to raise or lower the speeds of both extruder and feeder simultaneously. However, it is essential that these speeds may also be adjusted independently of each other so that the proportion of additive may be changed by changing the speed of the additive feeder in relation to the extruder speed. In normal operation under steady state conditions, it has been found desirable to maintain the extruder speed constant and to adjust the speed of the feeder to obtain the desired porportion of additive to resin. This also allows the changing of the proportion at any time during operation.

It can be seen that in the practice of the present invention the resin is fed to the extruder screw, is transformed to a molten condition by the application of heat and by extensive shearing and is mixed, all in the first stage of the extruder screw, before the additive is added to the resin. Thus, in contrast to prior art methods, where the additive is fed into the feed opening of the extruder along with the resin, the additive is not required to undergo extensive working under high temperature and, therefore, is not subject to degradation which might be caused by such working.

Although the preferred method and apparatus uses a three stage screw as described, the invention is not limited to the use of a three stage screw. For example, some materials may be processed without the need for venting, in which case the materials can be satisfactorily processed in a two stage screw and the third stage comprising sections H, I and J omitted. In other cases, the venting stage may be located upstream of the additive addition stage so that only the resin volatiles are removed by venting. Other arrangements are possible, and it is important only that in any arrangement the additive is introduced into the resin at a low pressure location such as the first low pressure section D of the second stage of the extruder screw.

EXAMPLES

An Egan vented extruder of 3½" inside barrel diameter with an effective length/diameter ratio of 36/1 was used to extrude various resins, as tabulated below. The nominal 3½" diameter extruder screw was configured as shown in FIG. 1 and as described in the foregoing specification.

The additive feeder comprised a barrel of about 3¼" diameter with an effective length of about 30 inches. The nominal 3¼" diameter feeder screw was configured as shown in FIG. 2.

The following materials were processed under the conditions shown.

EXAMPLE I

Run—1359-14B
Resin—Celanese Plastics Company Nylon 1000-1
Additive—PPG Industries glass fiber ⅛", #3531
Extruder Screw RPM—75
Feeder Screw RPM—14.5
Output—320 pounds per hour
Percentage of Additive—40% by weight
Remarks—On analysis the product was found to be of a quality comparable and in some respects to surpass the commercial products produced by prior art means.

EXAMPLE II

Run—1359-10B
Resin—Celanese Plastics Company Nylon 1000-1
Additive—Du Pont Surlyn
Extruder Screw RPM—75

Feeder Screw RPM—10
Output—258 pounds per hour
Percentage of Additive—27.5% by weight
Remarks—Extrudate showed some unmelted lumps, believed to be the Surlyn additive. Otherwise, quality was good.

EXAMPLE III

Run—1372-4
Resin—Polyester PLT
Additive—Calcium metasilicate (Wollastonite F-1)
Extruder Screw RPM—36
Feeder Screw RPM—18.5
Output—101 pounds per hour (resin only)
Percentage of Additive—61.5 by weight

EXAMPLE IV

Run—1371-5A
Resin—Tennessee Eastman PTMT Polyester
Additive—Owens Corning ¼" chopped glass X53
Extruder Screw RPM—100
Feeder Screw RPM—16
Output—702 pounds per hour
Percentage of Additive—27.8 by weight

We claim:

1. Apparatus for the production of an extrudate of a resin and an additive comprising in combination:
   a plastics extruder adapted to heat plastify resin having a barrel with a bore and a rotating screw within the bore having a melting stage and a low pressure section downstream of the melting stage;
   an inlet for said extruder disposed on said barrel to feed resin to said melting stage;
   an additive feeder adapted to feed additive to the resin in the extruder having a barrel with a bore and a rotating screw within the bore;
   the barrel of the additive feeder connected at one end to the extruder barrel with the bore of the additive feeder barrel intersecting the extruder barrel bore at a location corresponding to the low pressure section of the extruder screw, said low pressure being above atmospheric pressure;
   said intersection of said feeder barrel with said extruder barrel being axially displaced along said barrel from said inlet for said extruder;
   said rotating screw of the plastics extruder having an axial extension extending from said bore of said plastics extruder barrel upstream from said melting stage, and adapted to be coupled to rotary drive means and said rotating screw of the plastic extruder coacting with the barrel of said extruder to preclude movement of matter in said barrel counter to the direction from the inlet of said barrel to the outlet of said barrel;
   said rotating screw of said feeder having an axial extension extending from said bore of said feeder barrel and adapted to be coupled to rotary drive means to discharge a quantity of additive directly into the bore of said plastics extruder independently of the flow rate in said plastics extruder; and
   so that said screw of said feeder and said screw of said plastics extruder can be driven simultaneously to continuously and simultaneously mix a quantity of additive with the plastic as the plastic passes through the bore of the plastics extruder.

2. The apparatus according to claim 1 wherein means are provided to heat said barrel in said plastics extruder along substantially the entire length of said barrel.

3. The apparatus according to claim 1 wherein said rotating screw in said plastics extruder further comprises:
   a mixing stage downstream of said melting stage; and
   a venting stage downstream of said mixing stage.

4. Apparatus for the production of an extrudate of a resin and an additive comprising in combination:
   a plastics extruder adapted to heat plastify resin having a barrel with a bore and a rotating screw within the bore having a melting stage and a low pressure section downstream of the melting stage;
   an inlet for said extruder disposed on said barrel to feed resin to said melting stage;
   an additive feeder adapted to feed additive to the resin in the extruder having a barrel with a bore and a rotating screw within the bore;
   the barrel of the additive feeder connected at one end to the extruder barrel with the bore of the additive feeder barrel intersecting the extruder barrel bore at a location corresponding to the low pressure section of the extruder screw;
   said intersection of said feeder barrel with said extruder barrel being axially displaced along said barrel from said inlet for said extruder;
   said rotating screw of the plastics extruder having an axial extension extending from said bore of said plastics extruder barrel upstream from said melting stage, and adapted to be coupled to rotary drive means;
   said rotating screw of said feeder having an axial extension extending from said bore of said feeder barrel and adapted to be coupled to rotary drive means to discharge a quantity of additive directly into the bore of said plastics extruder independently of the flow rate in said platics extruder;
   so that said screw of said feeder and said screw of said plastics extruder can be driven simultaneously to continuously and simultaneously mix a quantity of additive with the plastic as the plastic passes through the bore of the plastics extruder; and
   means are provided to independently heat the additive feed barrel at its end portion adjacent to the extruder barrel.

5. The apparatus according to claim 4 wherein means are provided to heat said barrel in said plastics extruder along substantially the entire length of said barrel.

6. Apparatus for the production of an extrudate of a resin and an additive comprising in combination:
   a plastics extruder adapted to heat plastify resin having a barrel with a bore and a rotating screw within the bore having a melting stage, a low pressure section downstream of the melting stage, a mixing stage and a venting stage;
   an inlet for said extruder disposed on said barrel to feed resin to said melting stage;
   an additive feeder adapted to feed additive to the resin in the extruder having a barrel with a bore and a rotating screw within the bore;
   the barrel of the additive feeder connected at one end to the extruder barrel with the bore of the additive feeder barrel intersecting the extruder barrel bore at a location corresponding to the low pressure section of the mixing stage of the extruder screw said low pressure being above atmospheric pressure;
   said intersection of said feeder barrel with said extruder barrel being axially displaced along said barrel from said inlet for said extruder;

said rotating screw of the plastics extruder having an axial extension extending from said bore of said plastics extruder barrel upstream from said melting stage, and adapted to be coupled to rotary drive means and said rotating screw of the plastics extruder coacting with the barrel of said extruder to preclude movement of matter in said barrel counter to the direction from the inlet of said barrel to the outlet of said barrel;

said rotating screw of said feeder having an axial extension extending from said bore of said feeder barrel and adapted to be coupled to rotary drive means to discharge a quantity of additive directly into the bore of said plastics extruder independently of the flow rate in said plstics extruder; and so that said screw of said feeder and said screw of said plastics extruder can be driven simultaneously to continuously and simultaneously mix a quantity of additive with the plastic as the plastic passes through the bore of the plastics extruder.

7. The apparatus according to claim 6 wherein means are provided to heat said barrel in said plastics extruder along substantially the entire length of said barrel.

8. Apparatus for the production of an extrudate of a resin and an additive comprising in combination:

a plastics extruder adapted to heat plastify resin having a barrel with a bore and a rotating screw within the bore having a melting stage and a low pressure section downstream of the melting stage, a mixing stage downstream of said melting stage, a venting stage downstream of said mixing stage;

each of said melting stage, mixing stage, and venting stage of said rotating screw, comprises a metering section preceded by a transition section;

an inlet for said extruder disposed on said barrel to feed resin of said melting stage;

an additive feeder adapted to feed additive to the resin in the extruder having a barrel with a bore and a rotating screw within the bore;

the barrel of the additive feeder connected at one end to the extruder barrel with the bore of the additive feeder barrel intersecting the extruder barrel bore at a location corresponding to the low pressure section of the extruder screw;

said intersection of said feeder barrel with said extruder barrel being axially displaced along said barrel from said inlet for said extruder;

said rotating screw of the plastics extruder having an axial extension extending from said bore of said plastics extruder barrel upstream from said melting stage, and adapted to be coupled to rotary drive means;

said rotating screw of said feeder having an axial extension extending from said bore of said feeder barrel and adapted to be coupled to rotary drive means to discharge a quantity of additive directly into the bore of said plastics extruder independently of the flow rate in said plastics extruder; and so that said screw of said feeder and said screw of said plastics extruder can be driven simultaneously to continuously and simultaneously mix a quantity of additive with the plastic as the plastic passes through the bore of the plastics extruder.

9. The apparatus according to claim 8 wherein said additive feeder intersects said extruder barrel at said low pressure section disposed in said mixing stage.

10. The apparatus according to claim 9 wherein:
said venting section comprises a low pressure section in addition to said low pressure section in said mixing stage; and
said channel depth in said low pressure section of said mixing stage is greater than said channel depth in said metering section of said mixing stage.

11. Apparatus for the production of an extrudate of a resin and an additive comprising in combination:

a plastics extruder adapted to heat plastify resin having a barrel with a bore and a rotating screw within the bore having a melting stage, a low pressure section downstream of the melting stage, and a mixing stage and a venting stage;

each of said melting stage, mixing stage, and venting stage of said rotating screw, comprises a metering section preceded by a transition section;

an inlet for said extruder disposed on said barrel to feed resin to said melting stage;

an additive feeder adapted to feed additive to the resin in the extruder having a barrel with a bore and a rotating screw within the bore;

the barrel of the additive feeder connected at one end to the extruder barrel with the bore of the additive feeder barrel intersecting the extruder barrel bore at a location corresponding to the low pressure section of the mixing stage of the extruder screw;

said intersection of said feeder barrel with said extruder barrel being axially displaced along said barrel from said inlet for said extruder;

means to remove volatiles from the extrudate at a location corresponding to the venting stage of the extruder screw;

said rotating screw of the plastics extruder having an axial extension extending from said bore of said plastics extruder barrel upstream from said melting stage, and adapted to be coupled to rotary drive means;

said rotating screw of said feeder having an axial extension extending from said bore of said feeder barrel and adapted to be coupled to rotary drive means to discharge a quantity of additive directly into the bore of said plastics extruder independently of the flow rate in said plastics extruder; and so that said screw of said feeder and said screw of said plastics extruder can be driven simultaneously to continuously and simultaneously mix a quantity of additive with the plastic as the plastic passes through the bore of the plastics extruder.

12. The apparatus according to claim 11 wherein:
said venting section comprises a low pressure section in addition to said low pressure section in said mixing stage; and
said channel depth in said low pressure section of said mixing stage is greater than said channel depth in said metering section of said mixing stage.

* * * * *